Patented Feb. 24, 1931

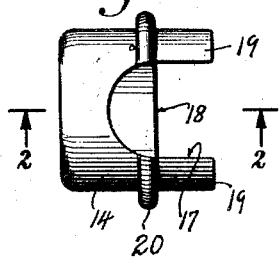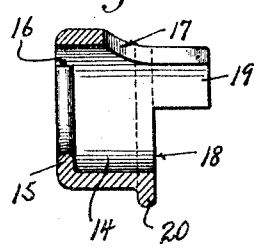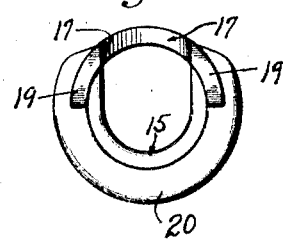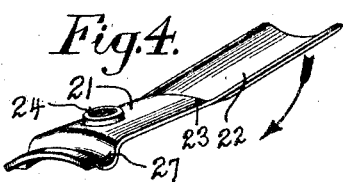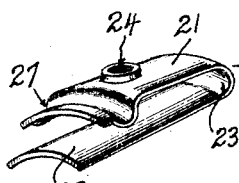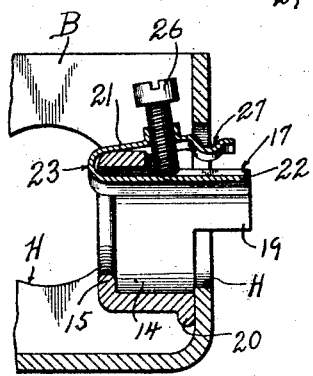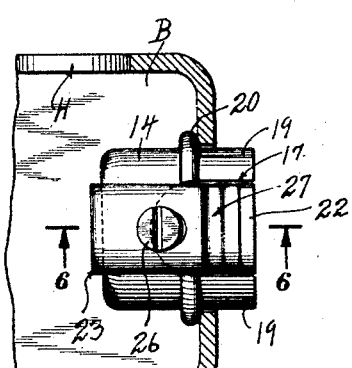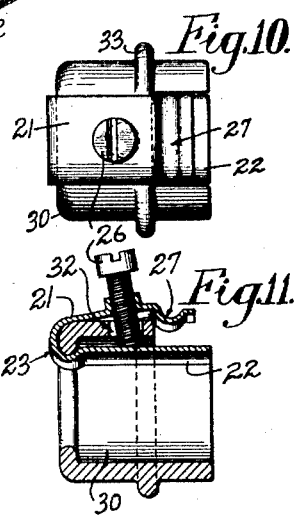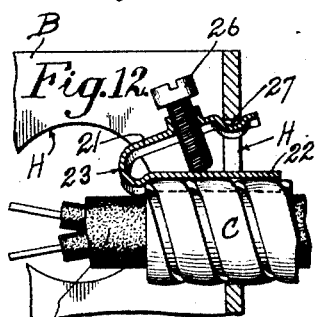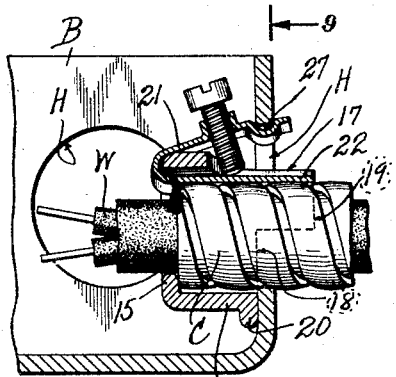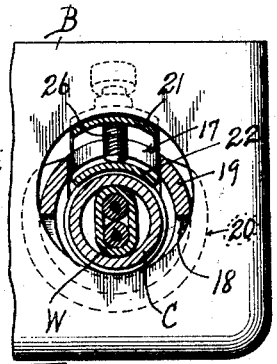

1,793,884

UNITED STATES PATENT OFFICE

LEWIS H. CHURCH, OF ROSELLE, NEW JERSEY, ASSIGNOR TO THE THOMAS & BETTS CO., OF ELIZABETH, NEW JERSEY, A CORPORATION OF NEW JERSEY

CABLE CONNECTER

Application filed March 31, 1927. Serial No. 179,749.

This invention relates to cable connecters to fasten cable to electric fixture and outlet boxes.

An object is to produce a cable connecter wherein a feature of the invention resides in a single clamp device which performs two main functions, that of securing the cable to the box and anchoring the connecter in the box, there being provided a single operating means such as a screw which is threaded into and carried with the clamp to cause the single clamp to perform its two or more functions; and I may refer to the clamp as a combination cable and box clamp and which is so constructed and arranged as to protect the cable from direct contact with the screw.

A further object of the invention is to produce a cable connecter which exposes the box hole edge directly to a cable therein placed, i. e. to produce an improved "exposed box hole edge type" cable connecter wherein the cable is gripped between the exposed box edge and connecter, certain features of novelty residing in the single clamp element of U-shaped design to perform the two functions by a single operating means such as a screw, and novelty also residing in the screw carried freely within a connecter member but threaded through the clamp, the screw preferably being disposed inside the box.

It is also an object to produce a cable connecter, the frame or connecter member of which does not necessarily require a screw threaded hole in which to place the screw but the member is so made that it includes an opening for freely mounting the screw in position, the screw acting to hold the connecter member and clamp in assembled relation, and the connecter frame member is novel in these and other respects.

Other objects are apparent from the following description and accompanying drawing showing examples of the invention, wherein:

The first three figures show the primary member of the cable connecter before assembling therewith the operating means such as a screw and the novel clamp, it being understood that the connecter member need not necessarily be made in sleeve form although shown as such in this example of the invention.

Figure 1 shows the connecter member in elevation looking from above or below. Figure 2 is a longitudinal sectional view taken on the place 2—2 of Figure 1. Figure 3 is an outer end view of the connecter member looking from the right in Figure 2.

The next two figures show the formation of the U-shaped combination cable and box clamp which is capable of performing two purposes to-wit, that of gripping or clamping against the cable, and that of anchoring against the box hole edge.

Figure 4 shows the stamping from which the cable and box clamp is made; and Figure 5 is a view in perspective showing the completed U-shaped clamp plate which in reality includes two clamp arms normally disposed in parallel relation adapted to spread apart and exert a powerful gripping force against both the cable and box hole.

Figure 6 shows a sectional box assembly with the connecter resting loosely within a box hole before a cable is inserted and before the operating means is tightened up, the section being taken on the line 6—6 of Figure 7.

Figure 7 is a longitudinal sectional box assembly view looking down on Figure 6 with the connecter in elevation.

Figure 8 is a box assembly view similar to Figure 6 but showing a cable secured in the box hole by the connecter with the operating screw tightened up and the U-shaped clamp in finally anchored position against both the cable and box hole edge.

Figure 9 is a sectional view on the line 9—9 of Figure 8, being an outside box end view.

Figures 10 and 11 are, respectively, a top view and a side longitudinal sectional view of a modified form of cable connecter wherein the connecter member is of full sleeve form, as distinguished from the exposed box hole edge type or form, so that the cable rests entirely within the sleeve connecter and is therefore not gripped against the exposed box hole edge.

Figure 12 shows a sectional box assembly view of the combination cable and box clamp together with an operating screw used alone as a cable connecter without the frame member part.

Electric fixture and outlet boxes B are made with knock-out openings or holes H to receive the connecter and cable C. By use of the improved connecter the cable C is anchored in the box B and electric wiring connections are made in the usual way inside the box with the wires W extending through the box hole.

In general, the cable connecter comprises a member on which is carried a combination cable and box two arm clamp having a novel mode of operation and in this instance being U-shaped in form, both arms of which serve in a gripping capacity, a screw or other operating means performing the double purpose of holding together the connecter member and the clamp and expanding both arms of the clamp to make it grip against two parts, namely the cable and box. The operating means is carried with the cable and box clamp and reacts to move both arms of said clamp, one arm against the box hole edge and the other arm against the cable.

To further describe the invention, reference is made to the drawing wherein the connecter member is shown as an example in the form of a sleeve 14 preferably formed with a bushing 15 at one end against which the ragged extremity of the cable C rests and out through which extend the wires W into the box B. The connecter member may be provided with a notch 16 in the bushing for the reception of, or through which is passed, one arm or end of a clamp shown in Figure 5 later described. The sleeve is slotted as at 17, this slot extending from the outer end of the connecter member 14 back towards the bushing end 15 for the purpose of receiving one or both arms of the clamp.

The connecter member 14 is also partly cut away at its outer end to form a transverse abutment face 18 adapted to rest against the inside box wall. The transverse cut-away line 18 extends partly through the sleeve leaving a projection 19 in which the slot 17 is formed. The sleeve extension 19 therefore extends beyond and overhangs the abutment end or edge 18 of the connecter member and affords length to the slot 17 to movably receive the free ends of the clamp arms. The form and construction of the connecter member 14 is such that, when mounted in the box hole H, a portion of said box hole edge is left exposed directly to a cable C with the connecter extension 19 projecting through the box hole and overhanging the exposed box hole edge portion.

The connecter member may also include a rib 20 in the same plane with the abutment edge 18, this rib reaching over the connecter extension to abut against the box wall and fix the connecter against movement in one direction. In fact the rib 20 makes the sleeve 14 too large to pass through the box hole so that only the sleeve extension 19 projects therethrough. The connecter member 14 is therefore of suitable size to fit in the box hole and includes cut-away means to expose a portion of the hole edge directly against a cable. Thus the member 14 is so formed as to extend into the box hole and be stopped by the abutment 18—20 to fix it against movement in one direction and uncover the box edge.

The clamp device and single operating means will now be described and reference is made to Figures 4 and 5 which merely show an example of the U-shaped combination cable and box clamp plate which is subject to various changes in form and use. Characteristically, one arm of the clamp anchors against the box edge and the other arm grips against the cable.

The clamp device comprises a stamping bent upon itself at 23 and having flexible ends or clamp plate arms 21 and 22 connected by the bend 23 which may lie within the notch 16 so as not to interfere with the bushing 15. The clamp member 21—22 is of general U-shaped design and is provided with a tapped screw hole 24 for the reception of operating means such as a cable clamp screw 26. The free end of the box clamp arm 21 is provided with suitable box hole anchorage means in the form of a groove 27 adapted to engage the box hole edge H proximate the connecter extension 19 while the cable clamp plate 22 is designed to press or grip against the cable C. The clamp arms flex at the arch or bend 23 and thus close or separate.

A description of the connecter member 14 and the novel clamp plate 21—22 has been given and it is seen that they are assembled by inserting the U-shaped clamp on the connecter member and then passing the shank of the screw 26 through the slot 17 of the connecter member 14. The screw 36 is run down against the cable clamp plate 22 and thus the screw holds the connecter member 14 and the flexible clamp 21—22 together without resorting to the formation of a special screw hole made through the connecter member for the reception of the screw. The arched or bent end 23 abuts one end of the connecter member while the screw shank abuts the end of the slot 17 and thereby prevents movement of the clamp in either direction.

The clamp arms 21 and 22 are in effect loosely confined within the slot 17 which permits the outer free ends of the clamp arms to closely approach each other in order that the connecter may be readily inserted into small size knock-outs. The slot 17 is therefore useful as a passage for the screw and an opening for the clamp arms, particularly the grooved end 27 of the upper clamp arm which must flex down into the slot 17 when the connecter is inserted within a small size box hole. The screw is free of the connecter member 14 since it is screw threaded thru and carried with the clamp, the screw shank being threaded into one arm and bearing on the other arm to effect a separating reaction.

The box assembly views show how the connecter is mounted within the box. Preferably the connecter is placed in the box hole from the inside thereof, before the screw 26 is screwed down through the box clamp arm 21. In other words the two clamp arms 21 and 22 lie proximate and parallel to each other when the connecter is inserted in the box hole. Furthermore the two clamp arms extend past the stop means rib 20 so that both free ends of the arms 21 and 22 reach to or preferably extend past the box wall and thru the box hole. Thereupon a cable C is inserted and the screw 26 is run down against the cable clamp plate 22, the result of which is to spread apart the clamp arms 21 and 22. This action of the screw firmly anchors the groove 27 of the box clamp arm 21 against the box hole edge and forces the cable clamp plate 22 down against the cable C thereby gripping the cable between the exposed box hole H and the flexible cable clamp plate 22.

The reaction of the screw 26 spreads apart the U-shaped clamp 21—22 and the downward pressure of the plate 22 against the cable C together with the upward pressure of the box clamp arm groove 27 against the box hole edge very firmly anchors the connecter member 14 in place within the box hole and against the inner wall of the box due to the opposition of forces exerted by the two clamp arms against the box and cable. In this way the sleeve 14 caps over and bushes the sharp ragged end of the cable C inside the box.

Figures 10 and 11 show a modified form of the invention wherein the sleeve 30 does not expose the box hole edge to the cable when the connecter is inserted in the box hole, but in this instance the sleeve 30 receives the cable directly thereinto and the cable is fastened within and against the sleeve wall. The sleeve 30 is slotted at 31 for the reception of the box hole edge anchorage arm groove 27 and the sleeve may be perforated at 32 for the reception of the screw. A rib 33 encircles the sleeve as a box wall abutment to stop the connecter member against the box. As far as the two-purpose clamp is concerned in Figures 10 and 11, it may be constructed and used in about the same manner as in the main form of the invention as above described and comprises the box hole anchorage groove 27 on the free end of the box clamp arm 21 together with the cable clamp plate 22. The two clamp arm portions are separated by reaction of the screw 26 when it is screwed thru the box anchorage clamp arm 21 and advances against the cable clamp plate 22.

In Figure 12 there is shown another modified form of the invention wherein the novel combination box and cable clamp and operating means are used alone without the connecter member or frame 14 to carry these parts, this view serving to further illustrate the principle of the invention. The screw 26 delivers pressure to the cable clamp plate 22 and the screw reacts thereby lifting upwardly on box anchorage arm 21 bending it at the end 23 to lift the anchorage groove 27 against the box hole edge H. In other words the clamp 21—22 moves apart with great force, the cable clamp plate 22 gripping against the cable and the box anchorage arm 21 fastening itself upon the box hole edge. In this way a single U-shaped clamp performs the double purpose of anchoring itself against the box hole edge and gripping against the cable and both functions are carried out by the lone operating screw 26 without the use of the connecter frame member 14.

I have therefore produced a new cable connecter by mounting a U-shaped clamp astride a sleeve member of the exposed box hole edge type, the two arms of the clamp preferably and characteristically reaching to or beyond the exposed box hole edge. In this way, one arm clamps the cable and the other arm anchors against the box hole edge. The two arms 21 and 22 according to my invention are both caused to react along the plane of the box wall, and to attain this mode of operation I bend the clamp plate into U-shape form to dispose both free ends of the arms across the box wall plane so that maximum separating reaction and movement may occur at the box wall for it is at and against the box wall that both the cable and the connecter are anchored in the main form of the invention.

In the novel construction of the connecter member 14 shown in the main form of the invention, it is clear that the cut-away face or sleeve end 18 exposes the box edge to receive the cable C firmly seated thereagainst, while the slot 17 above the edge 18 is designed among other things to uncover and expose another portion of the box hole edge to the clamp arm 21 in order that the anchorage groove means 27 may fasten itself upon the box edge.

Therefore the box edge is exposed to the clamp arm by the slot 17 in the cut-away sleeve 14 and by the slot 31 in the full sleeve 30, or by other suitable means whether or not by slots, the principle being the same in both and other forms of the invention. The main point is that I make the box clamp arm 21 long enough to reach to the box wall and I may provide a cut-away slot 17 and 31 to permit the full end of the box clamp arm to work up and down therein.

What I claim is:

1. A connecter comprising; a combination cable and box clamp including a box clamp arm with box hole edge anchorage means proximate one end thereof, and a cable clamp plate carried with the box clamp arm; a connecter member on which the combination cable and box clamp is carried, the end of said member adapted to abut the box-hole wall, and operating means carried with the combination cable and box clamp to simultaneously move both ends of said clamp to force the anchorage means against a box edge and to bear the plate against a cable.

2. A connecter comprising, a combination U-shaped cable and box clamp including arms, box hole edge anchorage means formed on one arm, the other arm acting as a cable clamp plate, operating means mounted on one arm and movably engaging the other arm to spread the arms, and a connecter member having a portion thereof disposed between the arms including an open space thru which the operating means loosely fits to hold the parts together.

3. A connecter comprising, a member formed to fit into a box hole and including means to expose a portion of the box hole edge, a combination cable and box clamp separate from the member carried on the member opposite to the box hole edge exposing means, anchorage means on one end of the clamp to fasten against a box hole edge and the other end acting as a cable clamp plate to grip against a cable at the exposed box hole edge, and operating means carried with the clamp to move both ends of the clamp into effective position against a box hole edge and against a cable.

4. A connecter comprising, a member formed to fit into a box hole and including means to expose a portion of the box hole edge, a combination U-shaped cable and box clamp carried on the member opposite to the box hole edge exposing means and including two clamp arms, anchorage means on one clamp arm to fasten against a box hole edge and the other clamp arm acting as a cable clamp to grip against a cable at the exposed box hole edge, a passageway in said member, and operating means carried with the clamp arm which fastens against the box hole edge and extending thru the passageway in said member to engage and force the other arm against a cable.

5. A connecter comprising, a sleeve formed to fit into a box and having a portion thereof cut-away to expose a portion of the box hole edge, a combination cable and box clamp carried on the member opposite to the cut-away portion, anchorage means on one end of the clamp to fasten against a box hole edge opposite to the cut-away portion and the other end acting as a cable clamp plate to grip against a cable at the exposed box hole edge, a passageway in said member, and operating means carried with clamp and extending thru the passageway in the member to move the box hole anchorage end of the clamp into position against a box edge and the other end against a cable.

6. A connecter comprising, a sleeve formed to fit into a box hole and having a portion thereof cut-away at one end to expose a portion of the box hole edge and including an extension overhanging the cut-away portion, said sleeve being provided with a slot formed in the extension, a combination U-shaped clamp including two parallel arms with anchorage means on one arm to fasten against a box hole edge and the other arm acting a cable clamp plate to grip against a cable at the exposed box hole edge, and operating means carried with one arm and reaching thru the slot in the sleeve to force both arms of the clamp apart.

7. A connecter comprising; a sleeve with a bushing at its inner end, and being cut-away at its outer end, forming a transverse abutment edge between the sleeve ends, a rib on the sleeve in the plane of the transverse edge, and a slot formed in the cut-away end opposite to the transverse edge; a U-shaped cable and box clamp mounted on the sleeve from the inner end including two clamp arms disposed proximate the slot, one arm extending beyond the transverse abutment edge and including box edge anchorage means formed on its end and the other arm acting to clamp against a cable; and a screw threaded thru one arm, extending thru the slot in the sleeve, and bearing on the other arm to force apart the clamp arms.

8. A connecter comprising; a sleeve with a bushing at its inner end, and being cut-away at its outer end, forming a transverse abutment edge between the sleeve ends, a rib on the sleeve in the plane of the transverse edge, and a slot formed in the cut-away end opposite to the transverse edge, a U-shaped cable and box clamp mounted on the sleeve from the inner end including two arms disposed proximate the slot, both clamp arms made long enough to extend beyond the transverse abutment edge, box anchorage means formed on one clamp arm and the other arm acting as a cable clamp plate; and a screw threaded thru that clamp arm which is provided with the anchorage means, said screw being passed thru the slot in the sleeve and bearing on the cable clamp plate.

9. A connecter comprising, a sleeve provided with a cut-away portion forming an opening therein to uncover a portion of a box edge when the sleeve is mounted in a box hole, a passageway in said sleeve, a U-shaped two-arm clamp carried on the sleeve and the free end of one arm movably disposed proximate the opening, and operating means carried with the connecter sleeve and passing through the passageway to force the free ends of the clamp arms apart to anchor one against a box edge and clamp the other against a cable.

10. A connecter comprising a sleeve, a notch in one end of said sleeve, an opening through the sleeve wall at the end opposite to the notch, stop means on the sleeve to position a sleeve in a box hole, a U-shaped clamp including arms disposed in the notch and embracing a portion of the sleeve wall, box hole anchorage means at the end of one arm; and operating means mounted on one arm, extending through the opening in the sleeve, and engaging the other arm to hold together the sleeve and clamp and to spread the arms apart.

11. A connecter comprising; a combination cable and box clamp including a box clamp arm with box hole edge anchorage means formed thereon and with its free end adapted to project through a box hole and be disposed within a box, and a cable clamp plate carried with the box clamp arm; a connecter member, a passageway through said member and operating means extending freely through the passageway and carried on the free end of the anchorage arm inside a box to simultaneously move both ends of said clamp to force the anchorage means against a box edge and bear the clamp plate against a cable.

In testimony whereof I affix my signature.

LEWIS H. CHURCH.